Dec. 3, 1929.   J. W. OGDEN ET AL   1,737,670
MAILING MACHINE
Filed April 9, 1928   6 Sheets-Sheet 5

Dec. 3, 1929.  J. W. OGDEN ET AL  1,737,670
MAILING MACHINE
Filed April 9, 1928   6 Sheets-Sheet 6

Patented Dec. 3, 1929

1,737,670

UNITED STATES PATENT OFFICE

JACOB W. OGDEN, CARL C. LUND, AND WALTER H. WHEELER, JR., OF STAMFORD, CONNECTICUT, ASSIGNORS TO PITNEY-BOWES POSTAGE METER COMPANY, OF STAMFORD, CONNECTICUT, A CORPORATION OF DELAWARE

MAILING MACHINE

Application filed April 9, 1928. Serial No. 268,550.

This invention is a novel machine for sealing and printing postal indicia on mail matter.

The primary object of the invention is to provide a machine which will be simple and economical in construction and efficient in operation, such machine embodying means for feeding the envelopes, means for sealing the envelopes, means for printing indicia thereon, and means for finally disposing of the envelopes in the receiver.

The machine is adaptable for operation upon various kinds of mail matter, such as cards, envelopes, small packages, etc. but is particularly designed for sealing and stamping envelopes. In the following description the objects to be operated upon are referred to as envelopes by which term we mean to include any kind of mail matter which may be operated upon by the machine.

We will explain one practical embodiment of the invention as illustrated in the accompanying drawings to enable those skilled in the art to adapt and use the same, and then summarize in the claims, the esentials of the invention, and the novel features of construction and novel combinations of parts for which protection is desired.

The machine shown in the drawings comprises a novel feed hopper, a separator, a novel arrangement of upper and lower feed belts, a guard for preventing smearing, means for moistening the flaps, means for pressing the flaps into contact with the body of the envelope after moistening to insure closing thereof before the envelopes are discharged into the receiver, means for printing postage indicia on the envelope, a self locking stacker end stop, a self locking side guide, an adjustable tilting plate in the receiver, and a shovel or device whereby the envelopes may be removed from the bottom of the receiver without interfering with the incoming envelopes.

In the machine shown the envelopes are preferably placed in the feed hopper shingled, that is with the flaps open and overlapping instead of having the flaps closed, but we do not consider the invention in its broader aspects restricted to the use of shingled envelopes.

In said drawings:

Figs. 10 and 10$^a$ are detail views showing the adjustable mounting of plate 7.

The machine has a base 1, on which is mounted an upright member 2; and a bracket 3. Supported by bracket 3 is the horizontally disposed guide plate 4. Directly over plate 4, near its right end, is a plate 5 which is part of or attached to a bracket 5$^a$ secured to the member 2. Said plate is inclined toward the left and a space is left between its lower edge and the guide plate 4 for the passage of envelopes. A plate 6 is also secured to the frame member 2 and projects to the left beyond plate 5. The plane of plate 6 approximates a right angle with the planes of both plates 4 and 5 but plate 6 is slightly inclined rearwardly in relation to both 4 and 5, that is, the angle at the intersection of 4 and 6 and also 5 and 6 is greater than a right angle. Behind both plates 4 and 5 approximately at right angles to each of them and between plates 6 and 4 is a space permitting the passage of the flaps of the envelopes as they are fed forward. A vertically disposed front plate 7 is adjustably attached to the bracket 5$^a$ and positioned opposite to the inclined plate 6.

Adjustably mounted on the left hand end of guide plate 4 is an adjustable tail piece 8, formed with two members 8$^a$ and 8$^b$ at right angles to each other and substantially perpendicular to guide plate 4. This tail piece can be moved either to right or left toward or from plate 5. The member 8$^b$ of the tail piece constitutes the left hand end of the feed hopper, of which the guide plate 4 is the bottom; and the member 8$^a$ forms part of the rear wall of the hopper, and is in effect a continuation of the plate 6.

The plates 4, 5, 6, 7 and tail piece 8 together form a rectangular feed hopper in which the envelopes are placed. The tail piece 8 is made adjustable to serve envelopes of varying lengths, and the front side plate 7 is made adjustable to suit varying widths of envelopes.

Figures 10, 10A:
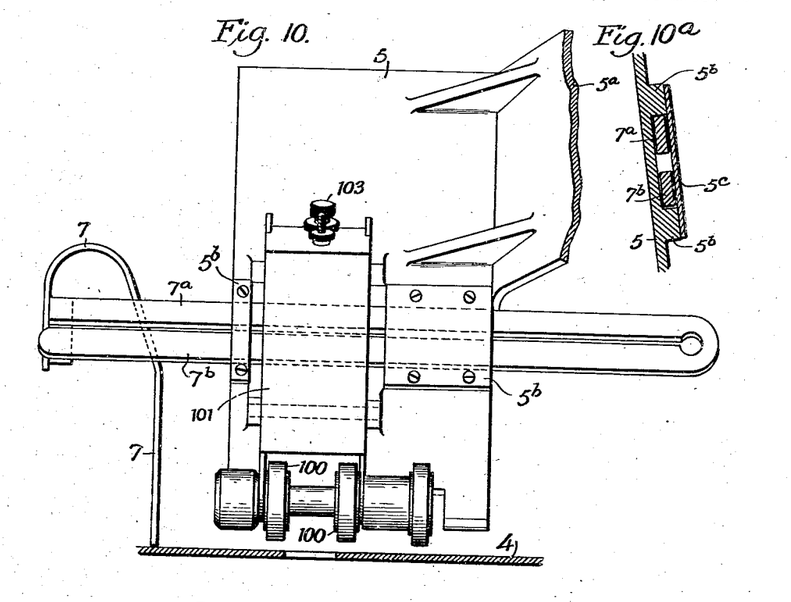

The front side plate 7 is preferably supported by a U-shaped bar having parallel legs 7$^a$, 7$^b$ (shown more clearly in Fig. 10) adjustably attached to bracket 5$^a$ as shown. On the bracket 5$^a$ are pairs of raised bosses 5$^b$ and connecting the bosses in each pair are strips 5$^c$ and the legs 7$^a$, 7$^b$ of the bar are confined between the bosses and strips. The legs of the U bar tend to spread apart and hug the top and bottom bosses 5$^b$. The front end of the leg 7$^a$ of the bar is bent at a right angle at 7$^c$, and is fastened to the upper curved portion of the plate 7 (see Figs. 1 and 10). By squeezing the legs of the bar together, the pressure on the walls of the passage is relieved, and the guide 7 may then be easily adjusted inward or outward. The friction of the legs on the bosses will normally hold the plate 7 firmly in position.

Figure 6:
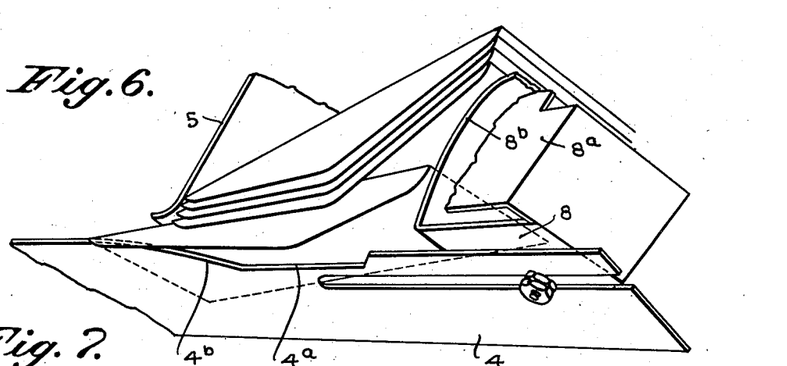
Fig. 6 is a detail view illustrating the method of feeding the envelopes.
Figure 7:
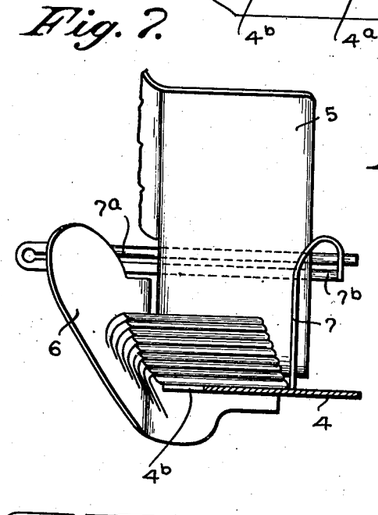
Fig. 7 is a detail transverse section through the feed envelopes.

The envelopes to be sealed are placed in the hopper just described, with their open ends toward the back, i. e. towards plates 6 and 8$^a$ and with their flaps downward and open, and preferably overlapping each other as indicated in Figs. 6 and 7 or "shingled".

Figure 8:
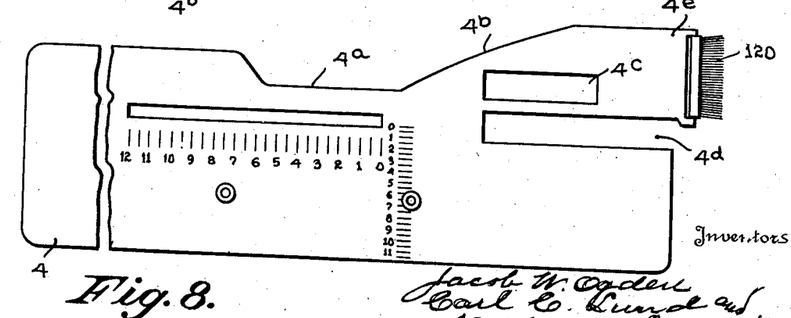
Fig. 8 is a detail top view of the bottom feed plate.
Figure 9:
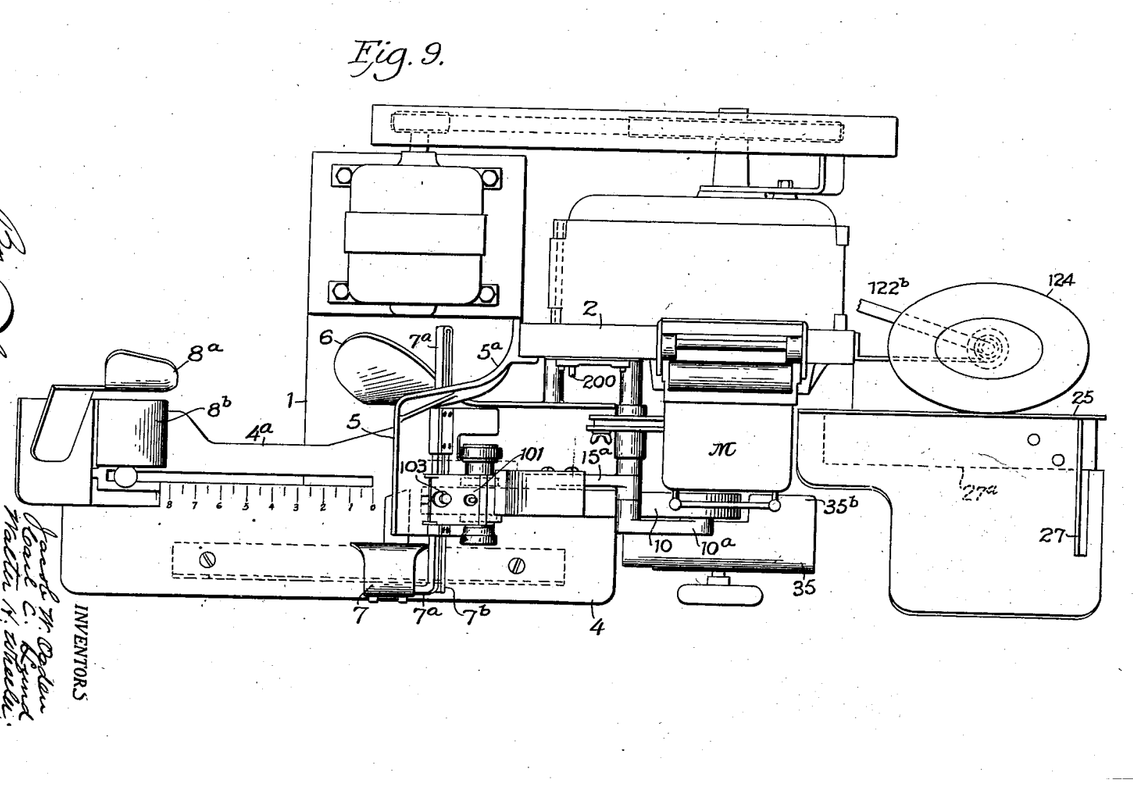
Fig. 9 is a top plan view of the complete mechanism forming the feed hopper.

Part of the back edge of the feed plate 4 is cut away at 4$^a$ (Figs. 6 and 8) to provide a space for the hanging flaps of the envelopes. The tail end of the pile of envelopes contacts with the curved upper end of member 8$^b$ of the tail piece and thus causes the pile to tilt toward the plate 5 and bear with a slight degree of pressure at their forward ends against said plate; and by reason of the inclination of plate 5 some of this pressure is diverted downward toward the bottom guide plate 4 and assists the feeding.

When envelopes are piled with their flaps "shingled" the top of the pile will tend to overhang the base on the side where the flaps lie, on account of the tendency of the flaps to spring back close to the bodies of the envelope (see Fig. 7). This tends to force the top of the pile over, and if the sides of the hopper were perpendicular to the base this would result in forcing the flaps still wider open and packing them so tightly together that separation would be difficult.

It is essential that the pile of envelopes should be so controlled or guided, that the bottom envelope which is to be fed into the machine will lie in the correct position, so that its flap will properly engage the moistener, and the envelope receive its imprint in the proper place. In order to accomplish this with the least possible resistance the back guide plate 6 is inclined away from both plates 4 and 5; its inclination away from the guide or bottom plate 4 approximates the natural slant of the pile of envelopes, and its inclination away from plate 5 is sufficient to cause the corners but not the edges of the envelopes to touch.

With this arrangement the letters are guided naturally into their proper position for being fed, no other force than gravtiy being required to properly position them for feeding (see Fig. 6). The curvature of the member 8$^a$ of the tail piece 8 in like manner serves to guide the tail ends of the letters. The aforesaid arrangement of plates makes but slight contact with the envelopes and not only reduces the friction but also provides an open feed hopper, which facilitates handling the mail.

In order to moisten the flaps of the envelopes prior to sealing same the flap must pass under the inner end of plate 4 while the body of the envelope passes over it; and owing to the fact that the pile is tilted lengthwise by its tail end engaging the member 8$^b$ the end of a very short flap will not extend down far enough to be below plate 4 also the flap has a tendency to close of its own accord and pass over plates 4 instead of under it. For this reason the rear edge of the bottom plate 4 is provided with a long curve as at 4$^b$ (see Figs. 6 and 8) which enters between the partly closed flap and the body of the moving envelopes thus insuring the correct passage of the flap under the moistener 120.

The envelopes are successively fed from the hopper to and past the moistening-sealing and printing devices by means of endless belts 9 and 10—which are preferably of rubber and respectively run over pulleys 11, 12; and 14, 15. The lower belt 9 is positively driven by the power driven pulley 11 and drive pulley 12. The upper belt 10 is driven by frictional contact with the lower. The feed pulley 12 is journaled on a stud 12$^b$ below the plate 4 and adjacent the lower end of plate 5. Said pulley has peripheral projection 12$^a$ at one side which is adapted at each rotation of the pulley to project through a slot 4$^d$ in the plate 4 and cause upper run of the belt 9 to engage the lowermost envelope in the hopper and move it forward by friction toward the moistening sealing and printing devices.

When the projection 12$^a$ is at the top of the pulley it causes the belt 9 to protrude through the opening 4$^d$ higher than the top surface of plate 4. A small idler pulley 13 turning on stud 13$^a$ mounted in bracket 3 to the right of pulley 12 serves to hold the upper side of the belt 9 in line with the normal path of mail through the machine and prevents the fluctuations in level of the belt 9 caused by the projector 12$^a$, affecting the entire upper run of the belt.

The upper feed belt 10 passes over the two idler pulleys 14 and 15 respectively mounted on swinging arms 14$^a$ and 15$^a$ each of which arms is pivoted on a stud 16 on the frame 2. The pivot 16 is considerably higher than the horizontal plane containing the centers of the idler pulleys 14 and 15, and the resiliency of the belt 10 is sufficient to draw the pulleys 14 and 15 toward each other, and downward—which insures firm contact of the lower arm of the belt 10 with the upper arm of belt 9. The envelopes are forwarded through the machine by the belts 9 and 10.

Figure 1:
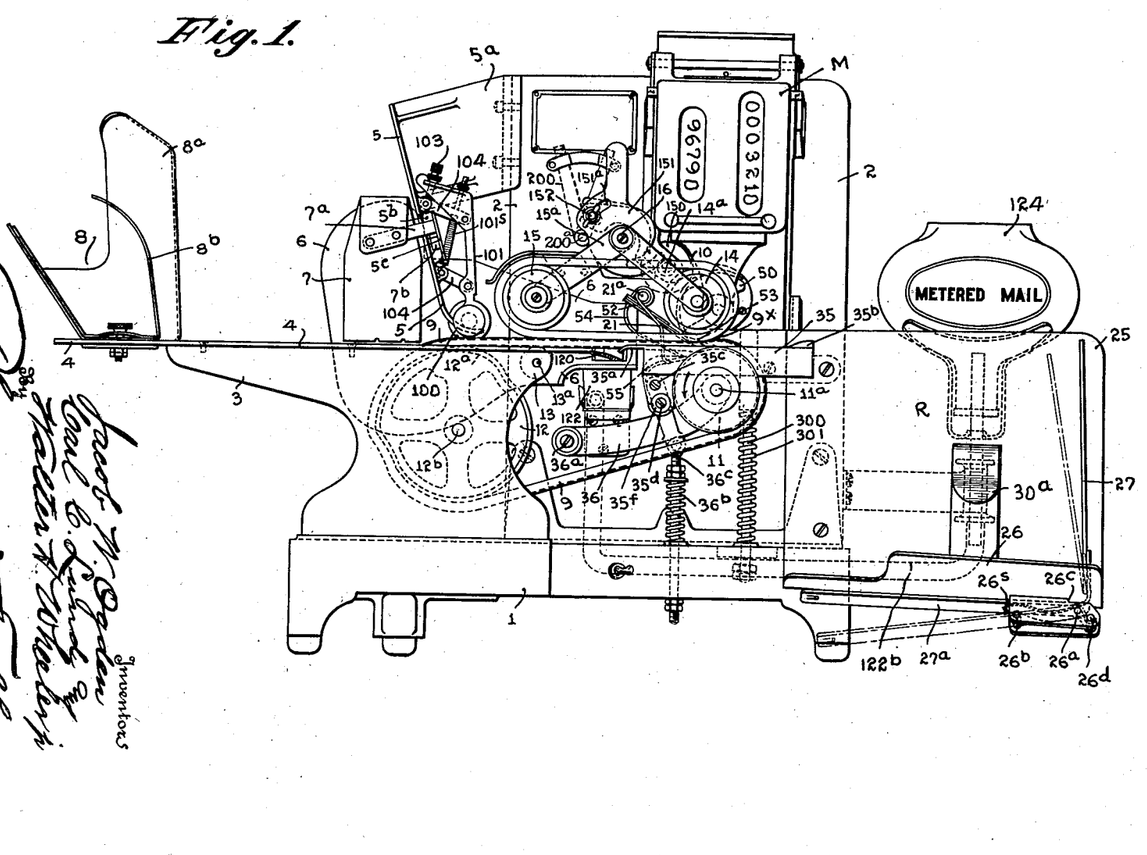
Fig. 1 is a side elevation of the complete machine.

To prevent the passage of more than one envelope at a time from the hopper a separator of any suitable kind should be employed. As shown a separator is placed at the lower end of the plate 5 as shown in Fig. 1. The separator is of such type that if two envelopes are simultaneously fed forward the separator will hold the upper one of them back, while the belt advances the other. Preferably the separator is composed of rubber faced rollers 100 rotatably mounted on a movable member 101 connected by links 104 to the plate 5, and normally drawn downward by a spring 101$^s$, the downward movement thereof being limited by an adjustable stop 103. Preferably the separator is constructed substantially as described in Pitney, et al. Patent No. 1,646,-107, dated October 18th, 1927, and as the construction thereof is not a feature of the present invention further explanation thereof is unnecessary.

The part of feed belt 9 which passes over the feed pulley 12 is directly under the mouth of the feed hopper and the hump 12$^a$ carries the belt 9 to contact with the lowermost letter in the feed hopper and carry it forward until it is pinched between the belts 9 and 10 as they pass between the pulleys 15 and 13. Preferably the surface of belt 9 is corrugated to more positively grip the envelopes.

It will be seen, Fig. 1, that the pulley 14 carrying belt 10 lies a little to the left of the pulley 11, which drives the lower belt 9; and the downward pressure of the pulley 14 on the belts coming at a spot where there is no counter resistance causes the lower belt 9 to take a slight upward curve at this point as indicated at 9$^x$ in Fig. 1, just as it passes onto the pulley 11.

After the envelope has passed the separator and the pulleys 13—15 it is carried on to and past the moistener. The moistener may be of any suitable construction but preferably consists of a tiltable moistener brush 120 which is arranged at the right hand end of plate 4 (Figs. 1 and 8) and normally dips into the water in a tank 122 in which water is maintained at a suitable level, and supplied from a bottle 124 by a pipe 122$^b$. The flap of the envelope is guided to and under the moistener 120 as the envelope passes thereover, by means of the rear right hand end portion 4$^e$ of the guide plate 4. We preferably use a moistener such as shown and described in the U. S. application of Frederick E. Poor, filed February 24th, 1927, Serial No. 170,566, Case No. 7,510, but any suitable moistener may be employed, and the particular construction of the moistener is not a feature of the present invention. Therefore no further description thereof is necessary.

Figure 4:
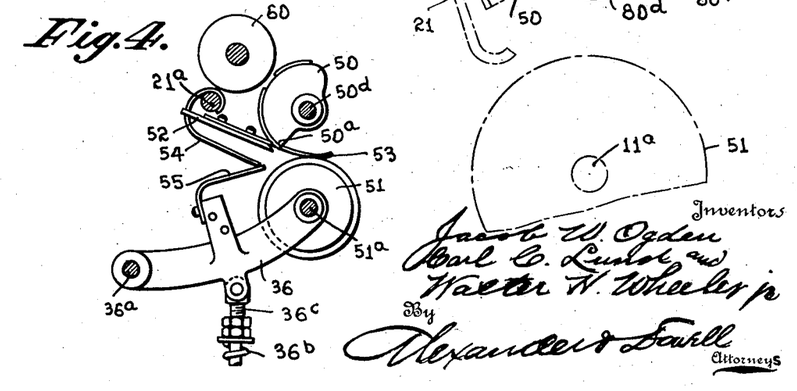
Fig. 4 is a detail end view of the printer and impression roller showing the anti-smear plate and the flap closing devices.

After the flap is moistened the envelope is carried on by the belts 9 and 10 and the moistened flap is closed and sealed. In order to press the moistened flaps firmly against the body of the envelope to assist the sealing operation and smooth it out prior to printing the postage indicia thereon the envelope is passed between a flap closing plate 55 and an opposed pressure spring 54 (Figs. 1 and 4). The flat spring 54 is made to bear against the top of the moving envelope and press it against the member 55 by which the flap is pressed against the body.

A flat spring plate 53 is attached to the top of the guard 52 (hereinafter explained) and is adapted to bear directly on the top crease of the envelope (i. e. the folded edge where the flap joins the body of the envelope) at a point beyond the printing devices so that it cannot interfere with the printing. The point of applied pressure of this spring 53 is directly over the impression roller 51 (Fig. 4) and this spring offers a slight resistance to the passage of the body of the envelope, while the flap (between which and the body of the envelope, there is more or less viscid mucilage) being in contact with the impression roller moves with more freedom, and tends to advance ahead of the body, this results in the flap being drawn tightly down and closed along its natural crease.

After being moistened and sealed the envelope is presented to the printing mechanism, but just before the envelope passes between the rollers 14 and 11, and while they are still held by and between the belts 9 and 10, the leading edge of the envelope contacts with and operates a trip finger 21 (Figs. 1, 2, 3) which releases the mechanism that controls the rotation of die 50 which imprints the indicia on the envelope.

In the machine shown the trip finger 21 is fastened to a shaft 21$^a$ placed to the left of pulley 14. The trip finger is bifurcated and inclines downward and straddles the adjacent runs of belts 9 and 10, the ends of the bifurcation projecting a considerable distance below the adjacent runs of the belts so that a letter brought forward by the belts will contact with and move the trip finger upwardly out of its path, and the trip finger in moving will rock the shaft 21$^a$ connected with the tripping mechanism.

The particular trip mechanism employed is not a feature of the present invention and may be such as shown in Pitney Patent No. 1,370,668, March 8th, 1921; and Pitney et al. Patent No. 1,646,108, October 18th 1927. In our present machine the trip mechanism is located in rear of the plate 2, and in brief comprises an arm 21$^b$ on the shaft 21$^a$ which is adapted to engage and move a link 21$^c$ when the trip finger 21 is raised by the passage of an envelope, and link 21$^c$ when so moved rocks a lever 21$^d$ that carries a roller 21$^f$ which is normally in the path of a roller 80$^f$ on an arm 80$^e$ attached to the shaft 80 carrying the printing die 50. This shaft 80 is adapted to be driven by frictional members 80$^a$ fast to the shaft and engaging a continuously driven friction member 80$^b$ which is driven by means of a pinion 90$^a$ on a continuously driven shaft 90 which may be driven from any suitable motor. The shaft 90 is connected by a universal coupling member 90$^b$ with the shaft 51$^a$ which carries the impression roll 51. The impression roller 51 is driven continuously but the printing die 50 will only be rotated when the trip finger causes the roller 21$^f$ to disengage the roller 80$^f$ then the frictional members cause the shaft 80$^d$ to make one revolution and turn the printing die one revolution but before the end of the revolution the trip devices are returned to normal position shown in full lines in Fig. 3 by means of springs S$^3$ and S$^4$ until the trip fingers are again actuated by another passing letter.

The construtcion of the tripping mechanism and of the mechanism for actuating the die 50 and impression roller 51 are not features of the present invention and therefore do not require detailed description herein.

Figure 2:
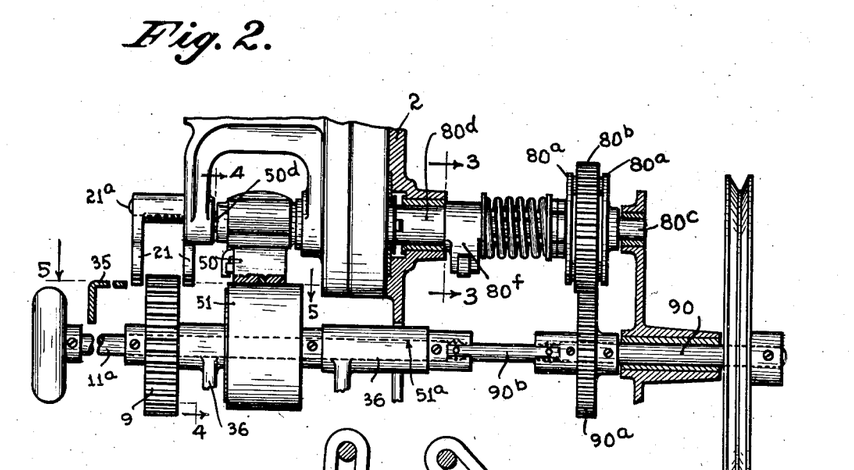
Fig. 2 is an enlarged detail sectional view through the machine in the approximate plane of the axis of the printing die and impression roll.

The printing die 50 might be mounted directly on an extension of the shaft 80$^d$, but in order that various denominations of dies may be used, and that the amounts or values of the stamps printed by such dies may be registered, the die is preferably mounted on a shaft 50$^d$ carried by a meter M, such as indicated in the aforesaid patents and more particularly shown and described in Pitney Patents No. 1,273,793, July 23, 1918; No. 1,370,668, March 8th, 1921; and No. 1,603,402, October 19, 1926. The meter M is removable from and replaceable in the machine as described in said patents and the shaft 50$^d$ on which the printer is mounted has a tongue on its rear end adapted to engage a slot in the outer end of the shaft 80$^d$ when the meter is slid into position as indicated in Fig. 2, thereby establishing rotative connection between the shafts 50$^d$ and 80$^d$ when the meter is in position in the machine. A rod 300 normally pressed upward by a spring 301 is provided to cushion the descent of the meter when it is being placed in position in the machine.

The shaft 51$^a$ carrying the impression roller 51, and the shaft 11$^a$, which is practically a continuation of shaft 51$^a$, are mounted in the bifurcated end of a bracket 36, the other end of which is pivoted on a stud 36$^a$ adjacent pulley 12. The bifurcated end of the bracket is yieldably supported by a rod 36$^c$ and spring 36$^b$, to permit the impression roller to yield to accommodate envelopes of varying thickness.

The trip finger 21 is preferably permitted to move from the nearly vertical position it normally occupies on the point where the curve 9$^x$ in the belt 9 begins, before its motion becomes effective in the actual release of the shaft 80$^d$. This extra play in excess of the necessary effective motion of the parts is provided so that the parts may acquire some momentum which will help in the release of the printer. And the rise in the belt 9 at point 9$^x$ aids in making the trip action quite easy and avoids mutilation of the edges of the envelope. Furthermore the placing of the point of release so close to the die 50, which is directly over the center line of the pulley 11 makes the interval between the tripping point and the beginning of the printing operations so short, that there is very little variation in the position of the imprints on envelopes due to variations in motor speeds, or clutch pressure, or thickness of the envelopes.

Figure 5:
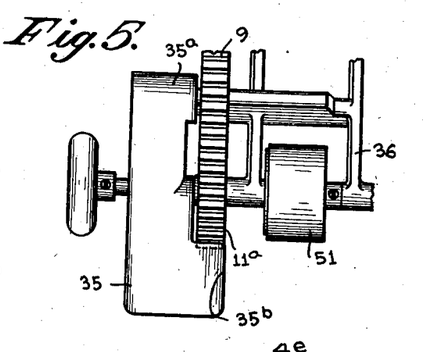
Fig. 5 is a detail top view of the impression roller and end guide plate.

After passing the sealing and printing devices the envelope is discharged into the receiver R. To insure the envelopes dropping into a horizontal position into the receiver a guide plate 35 (Figs. 1 and 5) is provided. The forward ends of short envelopes of light or flimsy character have a tendency to rise when discharged from the feed belts and the guide 35 overcomes such tendency by tilting up the outer edge of the envelope as it is discharged. The guide 35 comprises a horizontally disposed plate lying close to the feed pulley 11, and slightly below the level of the feed belt 9. The left hand end of plate 35 is curved downward at 35ª to avoid interference with oncoming letters, and its right hand end extends beyond pulley 11 toward the receiver, and lies directly in line with the discharge end of the feed belts. Its extreme right rear corner 35ᵇ is curved slightly upward in order to give the outer edge of the envelopes the lift previously mentioned.

Figure 11:
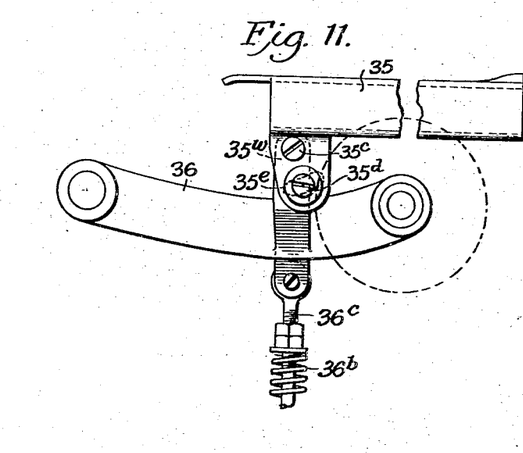
Figs. 11 and 12 are detail views showing the connection of the plate 35 to the bracket 36, and the means for adjusting said plate.
Figure 12:
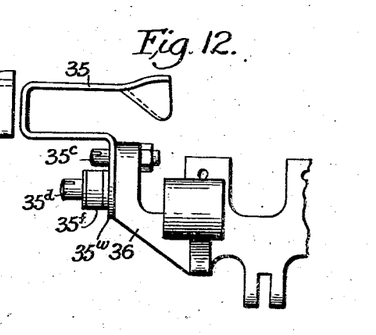

Long or heavy envelopes have less tendency to rise, and require to be tilted less, or not at all, and for this reason the stacker guide 35 has a depending finger 35ⁿ which is pivoted at 35ᶜ (Figs. 11 and 12) to the swinging arm 36 which carries the bearing for the pulley shaft 11ª. As this pivot 35ᶜ bears a constant relation to the pulley 11 the relation between the guide 35 and pulley 11 will not be disturbed when the pulley is forced downward by thick letters. Beside the pivot 35ᶜ the guide is further secured by a screw 35ᵈ engaging an elongated slot 35ᵉ in finger 35ⁿ and under the head of screw 35ᵈ is a spring washer 35ᶠ; this permits the guide 35 to be quickly adjusted up or down as the character of the mail demands, by simply moving it to the desired position by hand, the friction holding it in any adjusted position.

Because the tripping point is quite close to the line joining the centers of the printing die 50 and the impression roller 51, the leading edge of the engraved surface 50ª of the die also has to be positioned fairly close to the line, in order that the imprint may not fall too far back from the leading edge of the envelope. This makes the distance between the edge 50ª and the path of the moving envelopes very short also, and as the die 50 completes its revolution before the tail of the letter just printed has passed this point the freshly inked edge 50ª might rub against a thick letter and smear it. To avoid this possibility, a guard plate 52 (Figs. 1 and 4) is secured to the frame 2 and so placed that its edge will lie close to and slightly below the edge 50ª of the die. This plate shields the inked surface and prevents smearing of envelopes.

The receiver R for the sealed and printed letters consists of a back plate 25, a bottom plate 26 and an adjustable end plate 27; and includes a novel means for adjusting the position of the end plate 27 and holding it clamped in position by gravity; and a novel lifter which serves the double purpose of guiding envelopes into the stack and furnishing a convenient means of removing some of them while others are coming in.

Figure 13:
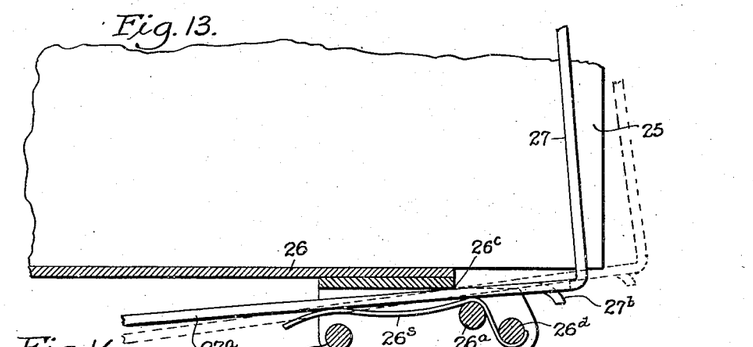
Fig. 13 is a detail showing the adjustable attachment of end plate 27 to the receiver.
Figures 14, 15:
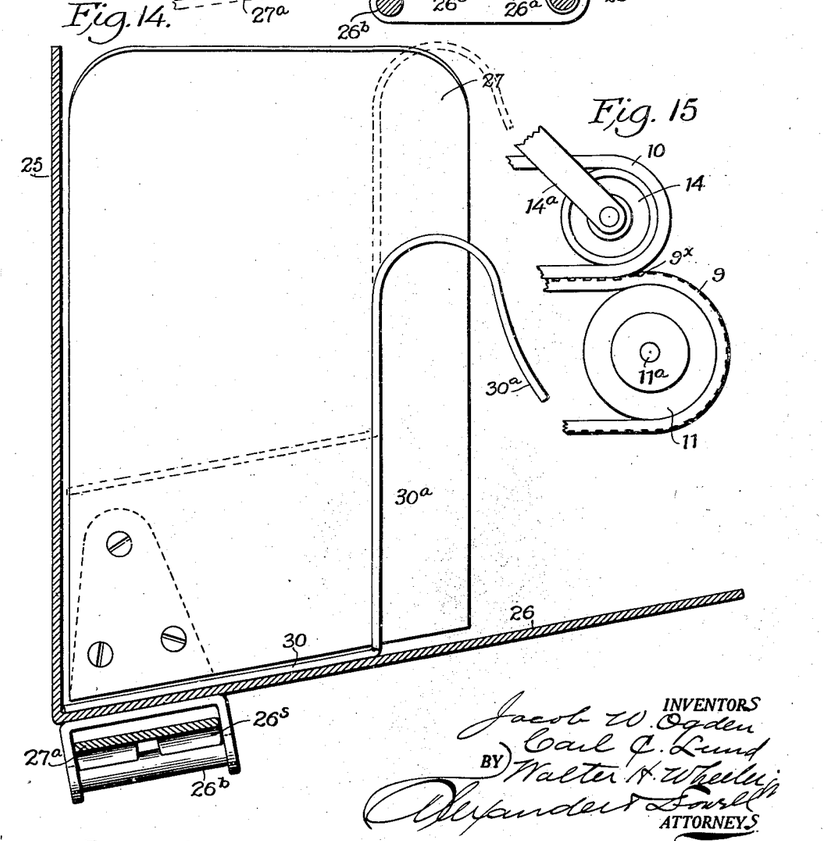
Fig. 14 is a detail transverse section through the receiver, with the shovel plate 30 therein.
Fig. 15 is a detail showing more clearly the rise 9$^x$ in the belt 9.

The end plate 27 has a horizontal finger 27ª extending from its lower edge; this finger passes under the bottom plate 26 and over two pins or rods 26ª and 26ᵇ suitably secured beneath plate 26 (see Figs. 13 and 14). The rod 26ª is placed in such relation to the rear edge 26ᶜ of plate 26 that the finger 27ª when in a horizontal position, will be pinched between them (see Fig. 13) but when the finger 27ª is tilted slightly (by tilting the end plate 27) as shown in dotted lines in Figure 13 the finger is freed and the end plate 27 may then be moved inward or outward. By this means the end plate may be set at will in any position, and any pressure on the plate 27 tending to move it toward the right will only serve to more tightly clamp the finger. The weight of the plate 27 is sufficient to hold the finger clamped, but if it should be necessary to place the plate 27 in its extreme inward position, the weight of the finger 27ª might then overbalance the weight of the plate 27. To guard against this a spring 26ᵉ (held in place by rod 26ᵈ and pressing upward against finger 27ª) counteracts the difference in weight and causes the finger to be clamped. Rod 26ᵇ limits the extent of tilting of the end plate and prevents straining of spring 26ᵉ.

The lifter comprises a rectangular plate 30 having a narrow extension 30ª on its front side turned up and looped over to form a handle. The lifter is laid on the bottom of the stacker with its handle 30ª in an upright position (see Fig. 14) and the outer edges of envelopes dropping into the receiver contact with the handle and are thereby tilted so that when they land on the pile the flap side of the letter hits first, and this smooths down the flap, should it have started to open up as sometimes happens in the case of envelopes with bulky contents. The handle 30ª also keeps the pile well lined up. To remove envelopes from the receiver without interfering with those incoming envolpes the lifter is slid out from the bottom of the pile and placed on top of it to catch the incoming envelopes. It can be held in this position with one hand, while the underlying letters are removed with the other hand.

The die 50 may be supplied with ink by any suitable means. As shown an ink supply roller 150 is mounted on a swingable support 151, which may be pivoted upon the pin 16 and can be fixed in any adjusted position by a set screw 152 engaging a slot 151ª in the support. The inking devices do not form any feature of the present invention and need no further explanation herein.

The machine may be driven by hand or power. Preferably it is driven by an electric motor (not shown) and the circuit through the motor may be controlled by a suitable switch lever but the motor and the electric connections form no feature of the present invention and need no further explanation.

To avoid the inconvenience of having to remove the meter, or printing attachment at times when letters are to be sealed only, a device has been installed on the machine which renders the movement of the trip finger 21 inoperative in releasing the printing die.

Figure 3:
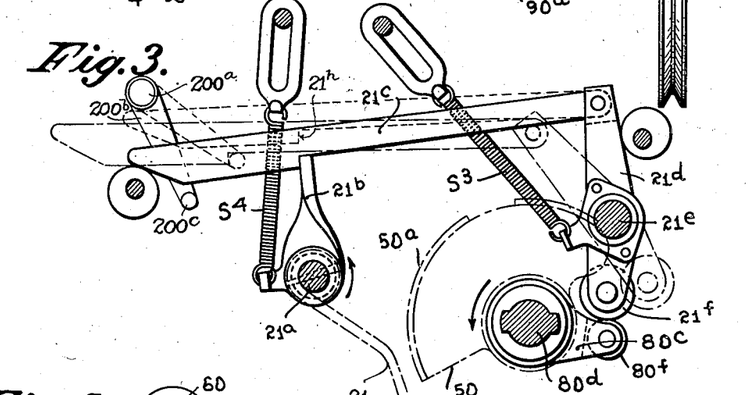
Fig. 3 is a diagrammatic vertical section in approximately the plane indicated by the line 3—3 in Fig. 2 showing parts of the trip mechanism.

Near the upper left hand corner of the upright frame 2 Fig. 1 is lever 200, made fast to a short shaft 200ª which passes through the frame 2, and has fastened to its other end—behind frame 2, another lever 200ᵇ Fig. 3. Lever 200ᵇ has a pin 200ᶜ projecting from its free end towards the frame 2; and the trip link 21ᶜ passing under shaft 200ª over pin 200ᶜ, and between lever 200ᵇ and frame 2, is entirely enclosed by the combination. When the lever 200ᵇ is moved upward by means of the hand lever 200, the pin 200ᶜ engages the under side of the link 21ᶜ and raises it up out of the arm 21ᵇ. When link 21ᶜ is thus raised, the arm 21ᵇ which is oscillated by the letters passing under the trip finger 21, cannot reach the hook 21ʰ on link 21ᶜ and in consequence there is no movement of the lever 21ᵈ to release the printing die.

Among the novel features of the machine attention is directed to: (1) The peculiar construction and shape of the feed hopper, including the arms 8 and 8ª, the adjustable tail slide, and the sloping entrance guide 6 which permits the free feeding of shingled envelopes and properly aligns the same; (2) the arrangement of the bottom plate 4 which enters between the flap and the body of the envelope as the latter is being fed forward; (3) the intermittent feed belt 9 extending through the entire machine and between the trip fingers and having the initial rise over idler roller 13 cause the envelope to be gripped and forwarded constantly through the short distance between the separation point and the first upper idler roller 15; (4) the upper idler belt 10 operating in conjunction with the lower belt 9 so the envelope is held firmly between the two belts as it moves forward, which permits the bifurcated trip finger 21 to be adjusted at any position along the path of the belt, thus permitting the tripping or operating of the die at practically any point desired to control the placing of the imprint upon the envelope; (5) the position of the upper idler roller 14 slightly in advance of the normal point of the tangent of the path of the letter to the impression roller, enables the letter to be more firmly gripped while it is passing through the normal tripping position just before reaching the printing point; (6) the guard 52 protects the die and prevents smearing which would otherwise occur because the stop position of the die is so close to the printing point and the printing commences almost immediately after tripping; (7) the pressure springs 53—54 press the flap into contact with the body of the envelope as it passes the moistener and the stacker; (8) the self locking stacker end stop 27; (9) the self locking side guide 7; (10) the adjustable tilting plate 35 whose proper adjustment is necessary to satisfactory stacking. Where the envelopes are fed from the hopper shingled, instead of with the flaps closed, the flaps have more tendency to open up than when fed closed and to overcome this the tilting plate is adjusted so as to give the outside edge of the letter a flip upward causing it to drop into the receiver in an inclined tilted position so that the flap side will first strike the pile of envelopes in the receiver and be kept closed by the body of the letter dropping from its transversely slanting position to a horizontal position in the receiver; (11) plate 30 is useful not only to hold up the incoming envelopes in the stacker while the bottom envelopes are withdrawn; but also to keep the envelopes from sliding outwards as they pile up in the receiver. The envelopes have a tendency to do this because the inside (flap side) of the pile of envelopes tends to build up more rapidly than the outside which eventually would cause the uppermost envelope to tilt and slide sideways out of the receiver were it not for the plate 30.

We claim:

1. In a machine of the characer specified, a feed hopper comprising a bottom guide plate, an end plate at its discharge end, an inclined end member at its opposite end, a rearwardly inclined rear plate adjacent the latter end member, a front plate, and a rearwardly inclined rear plate adjacent the discharge end plate—said plates being so disposed that a pile of shingled envelopes when placed in the hopper can tilt both longitudinally and transversely in accordance with the natural slant of a pile of superposed shingled envelopes.

2. In mechanism of the character specified, a front guide plate and a supporting bar for said plate having a return bend portion slidably engaging guides, whereby the plate can be readily adjusted, the resiliency of the bend holding it in frictional engagement with the guides and retaining the plate in any adjusted position.

3. In apparatus as set forth in claim 1, an endless feed belt, and a pulley below the feed hopper and having a peripheral projection whereby the belt is caused to withdraw the lowermost envelope from the hopper.

4. In a machine of the character specified, a feed hopper comprising a bottom guide plate, an inclined plate at its inner end, an adjustable tail piece at its outer end including an inclined end member and a rear rearwardly inclined member, an adjustable front plate, and a rearwardly inclined guide plate opposite the said front plate; said plates being relatively so disposed that a shingled envelope placed in the hopper will be caused to tilt both longitudinally and transversely while in the hopper in accordance with the natural slant of the pile of superposed shingled envelopes.

5. In a mechanism of the character specified in claim 4 a U-shaped supporting bar carrying said front plate and guides for said bar on the inner end plate, the resiliency of the bar holding it in frictional contact with the guides to retain the front plate in any adjusted position.

6. In apparatus as set forth in claim 4, an endless feed belt, a pulley having a peripheral projection to cause the belt to withdraw the lowermost envelope from the hopper and a separator cooperating with the belt to prevent more than one envelope being fed forward by the belt at one time.

7. In a machine of the character specified, a feed hopper provided with a bottom guide plate for supporting the envelopes, said plate having a recess in its rear edge to permit the flaps of the envelopes to depend below the plate, and also having a rear inner edge portion adapted to enter between the flap and the body of the envelope to insure correct presentation of the flap to the moistening devices.

8. In a machine of the character specified in claim 4, sealing and printing devices; and a pair of endless feed belts adapted to feed envelopes from the hopper, past said moistening sealing and printing devices; and a guide pulley for the lower feed belt having a projection adapted to cause said belt to project into the hopper and engage the lowermost letter and eject the same from the hopper.

9. In a machine of the character specified having a feed hopper, sealing devices and printing devices, upper and lower feed belts for conveying the envelopes from the feed hopper to the sealing and printing devices; pulleys adjacent the feed hopper and the printing devices for guiding the lower belt, the pulley adjacent the feed hopper having a peripheral projection whereby the belt is caused to engage the lowermost envelope and forward the same out of the hopper, and yieldably supported pulleys carrying the upper belt.

10. In mechanism of the character described, an adjustable guide plate adapted to lift the outer edge of the envelope and tilt the envelope rearwardly as it is discharged from the printer.

11. In a machine of the character described, a receiver having a bottom plate and an adjustable end plate, said end plate having a finger underlying the bottom plate, and a fulcrum for the finger whereby the weight of the end plate causes the finger to clamp against the bottom plate.

12. In a machine of the character specified, having a receiver for the envelopes; a lifter plate adapted to be placed in the receiver having an upstanding handle adapted to assist in properly positioning the envelopes in the receiver when the lifter is in position therein.

13. In a machine of the character set forth having feed belts and a receiver; a bracket yieldably supporting the rear guide pulley of the lower belt, and a guide plate mounted on this bracket adapted to lift the outer edge of the envelopes as they are discharged into the receiver.

14. In a machine of the character specified having feeding sealing and printing devices; a feed hopper; a pair of endless feed belts adapted to feed envelopes from the hopper past said sealing and printing devices; and pulleys supporting the feed belts, the uppermost of the two last pulleys for the belts being disposed slightly to the inside of the lowermost last pulley whereby the upper run of the lower belt is caused to take a slight upward curve adjacent the printing point and directs the envelope upwardly as it emerges from between the tapes.

15. In a machine of the character specified having sealing and printing devices; a feed hopper; a pair of endless feed belts adapted to feed envelopes from the hopper past said sealing and printing devices; pulleys supporting the feed belt; and an adjustable guide plate adapted to lift the outer edge of the envelope and tilt the same rearwardly as it is discharged from the printing devices.

16. In mechanism as set forth in claim 14 an adjustable guide plate adapted to lift the outer edge of the envelope and tilt the same rearwardly as it is discharged from the printing devices.

W. H. WHEELER, JR.
J. W. OGDEN.
C. C. LUND.